United States Patent
Roth et al.

(10) Patent No.: US 7,942,981 B2
(45) Date of Patent: May 17, 2011

(54) ROTATIONALLY SYMMETRICAL HOLLOW BODY MADE OF A DEFORMABLE PERMANENTLY MAGNETIC ALLOY AND ITS USE AND PRODUCTION PROCESS

(75) Inventors: Ottmar Roth, Gründau (DE); Hartwin Weber, Hanau (DE); Lutz Hinrich, Freigericht (DE); Jens Diehl, Langenselbold (DE)

(73) Assignee: Vacuumschmelze GmH & Co. KG, Hanau (DE)

( * ) Notice: Subject to any disclaimer, the term of this patent is extended or adjusted under 35 U.S.C. 154(b) by 554 days.

(21) Appl. No.: 11/857,946

(22) Filed: Sep. 19, 2007

(65) Prior Publication Data

US 2008/0160335 A1    Jul. 3, 2008

Related U.S. Application Data

(62) Division of application No. 10/854,825, filed on May 27, 2004, now abandoned.

(30) Foreign Application Priority Data

Jun. 13, 2003   (DE) .................................. 103 27 082

(51) Int. Cl.
*H01F 1/04* (2006.01)
*H01F 1/047* (2006.01)
*H01F 1/053* (2006.01)

(52) U.S. Cl. ......... 148/103; 148/101; 148/120; 148/590

(58) Field of Classification Search .................... None
See application file for complete search history.

(56) References Cited

U.S. PATENT DOCUMENTS

| 4,075,437 | A | * | 2/1978 | Chin et al. ..................... 381/417 |
| 4,253,883 | A | * | 3/1981 | Jin .................................. 148/103 |
| 4,311,537 | A | * | 1/1982 | Chin et al. ..................... 148/108 |
| 4,601,764 | A | * | 7/1986 | Iijima et al. .................... 148/101 |
| 4,715,904 | A | * | 12/1987 | Iijima et al. .................... 148/102 |
| 4,818,305 | A | * | 4/1989 | Steingroever ................. 148/103 |
| 4,950,550 | A | * | 8/1990 | Radeloff et al. .............. 428/611 |
| 5,091,021 | A | * | 2/1992 | Perry et al. .................... 148/103 |
| 5,627,924 | A | * | 5/1997 | Jin et al. .......................... 385/16 |
| 5,631,093 | A | * | 5/1997 | Perry et al. .................... 428/611 |

(Continued)

FOREIGN PATENT DOCUMENTS

DE               64024    * 10/1968

(Continued)

OTHER PUBLICATIONS

Preliminary Search Report of Dec. 7, 2005 issued by the French Patent Office, FR 0406321, 3 pages.*

*Primary Examiner* — John P Sheehan
(74) *Attorney, Agent, or Firm* — Buchanan Ingersoll & Rooney PC

(57) ABSTRACT

A seamless, rotationally symmetrical hollow blank formed by a non-cutting operation from a deformable permanently magnetic alloy is provided, said alloy consisting essentially of 5.0 to 20.0 percent by weight cobalt, 20.0 to 35.0 percent by weight chromium, for the remainder iron and impurities caused by melting and/or by chance. The seamless hollow body is suitable in particular for use in hysteresis clutches, hysteresis brakes, and position measuring devices. Furthermore, non-cutting shaping processes for producing the seamless rotationally symmetrical hollow body are provided, with roller spinning being preferred.

20 Claims, 1 Drawing Sheet

U.S. PATENT DOCUMENTS

| | | | | |
|---|---|---|---|---|
| 5,845,527 A | * | 12/1998 | Hoffmann et al. | 72/69 |
| 6,232,686 B1 | * | 5/2001 | Schneider | 310/77 |
| 6,717,401 B2 | * | 4/2004 | Schwabe | 324/207.22 |
| 7,131,304 B2 | * | 11/2006 | Arai | 72/82 |

FOREIGN PATENT DOCUMENTS

| | | | |
|---|---|---|---|
| DE | 3406807 A1 | * | 10/1984 |
| DE | 19936681 A1 | * | 4/2000 |
| EP | 0151976 A2 | * | 1/1985 |
| EP | 0151976 A2 | | 8/1985 |
| EP | 0 239 838 | * | 10/1987 |
| EP | 0239838 A1 | | 10/1987 |
| GB | 2177420 A | * | 1/1987 |
| JP | 56146860 A | | 11/1981 |
| JP | 58087253 A | | 5/1983 |
| JP | 59024000 A | | 2/1984 |
| JP | 59-24000 | * | 7/1984 |
| JP | 61190901 A | | 8/1986 |
| JP | 61-221329 | * | 10/1986 |
| JP | 61221329 A | | 10/1986 |
| JP | 61274216 | | 12/1986 |
| JP | 4262502 A | * | 9/1992 |
| JP | 6186054 | | 7/1994 |
| JP | 2004262502 A | | 9/2004 |
| WO | 98/36488 | | 8/1998 |

* cited by examiner

ROTATIONALLY SYMMETRICAL HOLLOW BODY MADE OF A DEFORMABLE PERMANENTLY MAGNETIC ALLOY AND ITS USE AND PRODUCTION PROCESS

PRIORITY

This application is a divisional application of U.S. patent application Ser. No. 10/854,825 filed May 27, 2004 now abandoned; which claims foreign priority to German application number DE 10327082.5 filed Jun. 13, 2003, the contents of these applications are incorporated herein in their entirety by this reference.

TECHNICAL FIELD OF THE INVENTION

The invention relates to rotationally symmetrical hollow bodies made of deformable permanently magnetic alloys, in particular cup-shaped hollow bodies, which are also referred to as L rings, and to annular hollow bodies, which are also referred to as I rings.

BACKGROUND OF THE INVENTION

The invention relates to rotationally symmetrical hollow bodies made of deformable permanently magnetic alloys, in particular cup-shaped hollow bodies, which are also referred to as L rings, and to annular hollow bodies, which are also referred to as I rings.

It has so far been known to produce such I rings or L rings by means of sintering processes. For example, rings are produced for this purpose from aluminum-nickel-cobalt alloys, known as AlNiCo rings, by means of powder-metallurgical sintering. Such a process and such rings are known for example from U.S. Pat. No. 4,818,305. However, the sintered rings have the great disadvantage that on the one hand they are very brittle, i.e., tend to break during use. On the other hand, the base materials suitable for them, in particular AlNiCo, only have magnetic properties that are less than optimal, with the result that it is impossible to produce rings which have both outstanding magnetic properties and outstanding mechanical properties.

Furthermore, it is known to produce I rings by firstly bending a strip to form an I ring and welding it together at its ends. This method of production presents quite considerable magnetic and mechanical problems. Both magnetic and mechanical defects occur in the region of the weld seam. In particular, the roundness of the I rings produced is very poor. The production tolerances are too high for a number of application areas. Extensive finishing work generally has to be carried out in the region of the weld seam. I rings which have been produced by this production process are known for example from DE 199 36 681 A1.

SUMMARY OF THE INVENTION

There has therefore long been a demand for seamless rotationally symmetrical hollow bodies made of permanently magnetic alloys having very low production tolerances with respect to roundness.

According to the invention, this need is met by a seamless, rotationally symmetrical hollow body shaped by a non-cutting operation from a deformable permanently magnetic alloy, which consists essentially of 5.0 to 20.0 percent by weight cobalt, 20.0 to 35.0 percent by weight chromium, for the remainder iron and impurities caused by melting and/or by chance. The term "consisting essentially of" is understood here and hereafter as meaning that, apart from the specified main constituents of cobalt, chromium and iron, the alloy selection according to the invention has only small additions of further metals, which serve for finely adjusting the mechanical and magnetic properties. Accordingly, the alloy may additionally have one or more of the elements Zr, Ti, Hf, V, Nb, Ta, Mo, W, Mn, Si, Al, Ni, Sn, Cu, Zn, Ge, B, along with rare earths accounting for a total proportion of the alloy of less than 5 percent by weight.

According to another embodiment of the invention, the invention is directed to a process including the following: melting of an alloy and casting the alloy to form an ingot; hot forming of the ingot to form a thin slab; hot forming of the thin slab to form a hot strip with a fine-crystalline microstructure comprising an average grain size of <300 μm; intermediate annealing of the hot strip above a temperature of 800° C.; cold forming of the hot strip to form a strip; production of a round blank from the strip; roller spinning of the round blank to form a hollow body; and magnetic annealing of the hollow body.

BRIEF DESCRIPTION OF THE DRAWINGS

The invention is described in detail below on the basis of comparative examples and exemplary embodiments and also by the figures, in which.

DETAILED DESCRIPTION OF THE PREFERRED EMBODIMENTS OF THE INVENTION

Figure 1:
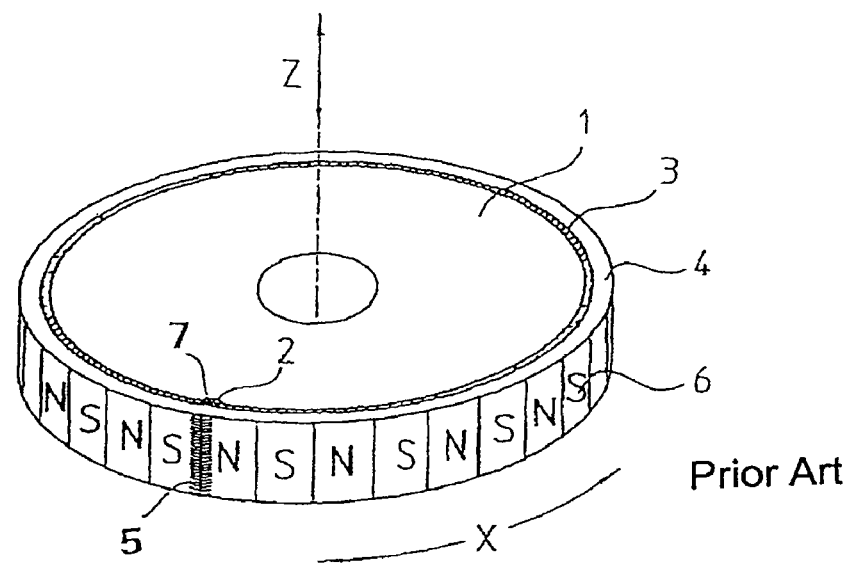
FIG. 1 shows a solid gage with an I ring from the prior art.

From the multiplicity of known deformable permanently magnetic alloys, the alloy system presented above has proven to be suitable for non-cutting shaping processes. The alloy system according to the invention has a decidedly high ductility and can be cast and rolled to form a very fine-crystalline microstructure. The alloy system according to the invention accordingly has a malleability that is suitable for the non-cutting shaping processes.

Non-cutting shaping processes are understood here and hereafter as meaning, inter alia, axial die rolling, spin extrusion, profile rolling and in particular roller spinning.

Roller spinning is understood as meaning a process for the non-cutting shaping of rotationally symmetrical hollow bodies. In this process, a preform is fixed between the spinning bush and the tailstock and set in rotation. The preform is usually known as a round blank. One particularly characteristic feature of this process is that the shaping partially takes place by compressive stress, which is introduced into the material by radially guided spinning rollers. The material flows and in a roller overflow assumes the contour of the inner spinning bush. Depending on the form of the spinning bush, pot-shaped hollow bodies or conical hollow bodies can be produced in this way.

The production accuracy corresponds to that of finishing on a lathe. Uninterrupted fiber flow of the material and the increase in the strength dependent on the degree of shaping are distinguishing features of the use of roller spinning. Roller spinning can be used for processing malleable alloys. It is known from the prior art to process various stainless steels and in particular various aluminum alloys by roller spinning. These materials can thereby be shaped to a tensile strength of up to about 2200 M/mm². A distinction is drawn between different types of roller spinning:

In cylinder roller spinning, forms of lateral surface which cannot in principle be achieved by other shaping processes, for example, sinking and deep drawing, can be produced. Three spinning rollers, respectively offset by 120°, thereby engage simultaneously.

In what is known as co-directional roller spinning, the direction of axial advancement of the spinning rollers and the direction of flow of the material are the same. Short pot-shaped hollow bodies, known as L rings, can be advantageously produced, being shaped in an overflow by correspondingly configured spinning rollers by a combination of prior bending and cylinder roller spinning.

In counter-directional roller spinning, the movement of the material is restricted in the direction of the axial advancing movement of the spinning rollers by a stop, so that the material flows under the spinning rollers counter to the direction of advancement. As a result, the production of particularly long, cylindrical hollow bodies is possible.

In projecting roller spinning, a planar starting form is projected with a spinning roller onto the angle of inclination of the spinning bush. During the shaping, the material is axially displaced in the shaping zone. The diameter of the starting form then corresponds to the diameter of the final form. Conical, concave or convexly curved hollow bodies can be produced.

In the simplest case, a round blank, which serves as the starting form, is shaped on a conical spinning bush. The achievable final wall thickness is directly dependent on the angle of inclination of the workpiece contour and on the thickness of the starting plate.

For hollow bodies that require particularly high precision, projecting roller spinning is carried out with two rollers lying opposite each other.

In the spinning, the round sheet-metal blanks, or else preforms prefabricated for example by deep drawing, are clamped between the spinning bush and the pressing plate, then fixed by means of frictional engagement and set in rotation by the main drive, and finally shaped to form rotationally symmetrical hollow bodies. The spinning roller locally engages the circumference of the workpiece and shapes the round blank stage by stage, until the workpiece bears against the spinning bush lying on the inside. The wall thickness remains approximately constant during the shaping.

In the case of the method according to the invention for producing a seamless rotationally symmetrical hollow body from a deformable permanently magnetic alloy, firstly an alloy is melted and then it is cast in a mold.

The melting of the deformable permanently magnetic alloy, which consists essentially of 5.0 to 20.0 percent by weight cobalt, 20.0 to 35.0 percent by weight chromium and for the remainder iron, preferably takes place under an inert gas atmosphere or a vacuum, in order to keep the content of impurities as low as possible. A low impurities content is very important for the magnetic properties, i.e., the impurities of metals and of P, O, S, N, C and B caused by melting and/or by chance should be kept as low as possible. However, ladle metallurgical processes are also conceivable.

The cast ingot is then hot-formed with a degree of hot forming of more than 90% into a thin slab and subsequently into a hot strip with an intermediate thickness. The hot forming generally takes place at temperatures above 1100° C. It is thereby ensured that a fine-crystalline microstructure of which the average grain size does not exceed 300 μm is obtained. Furthermore, it must be ensured in this hot-forming step that no anisotropy is induced in the hot strip (rolling anisotropy).

Subsequently, the hot strip is intermediately annealed and homogenized above a temperature of 800° C. The intermediately annealed and homogenized hot strip is subsequently cold-formed to form a strip with a degree of cold forming of less than 20%. Round blanks are then made from the strip produced in this way. The diameter of the round blanks thereby depends on the diameter of the L rings or I rings to be produced later. Since the surface quality of the round blanks plays a decisive role in the subsequent roller spinning, the round blanks are subjected to a suitable surface treatment. Either a grinding process or a turning process comes into consideration here as the surface treatment. Furthermore, chemical processes such as pickling or electropolishing and shot peening are also to be regarded as suitable.

In the case of these processes, the achievement of maximum depths of roughness of less than 15 μm are required. Surface defects such as rolled-in extraneous matter, back fins and cracks must be avoided or eliminated. Furthermore, it has been found that the edges of the round blanks must be worked. This involves removing the surface on both sides, in order to eliminate possible burr and incipient cracks. As described above, roller spinning is then used as described above to produce the seamless rotationally symmetrical hollow bodies from the round blanks according to the invention. These are typically L rings, from which a number of I rings are then removed.

The production process according to the invention is completed by final magnetic annealing of the hollow body. In this process, the magnetic values required for the application are set. This final annealing typically takes place on an annealing body with defined properties.

The seamless, rotationally symmetrical hollow bodies according to the invention that are produced in this way have roundness tolerances of less than 0.15 mm for a diameter of about 120 mm and are consequently significantly better than the rings produced by the conventional process.

The process according to the invention is suitable in particular for hollow bodies with wall thicknesses of less than 3 mm and diameters of less than 350 mm.

EXAMPLES

Comparative Example 1

10 I rings with a diameter of 110.7 mm and a wall thickness of 1.5 mm were produced by bending a strip made of an alloy comprising 27.5 percent by weight chromium, 10.5 percent by weight cobalt and for the remainder iron to form a ring and welding the ends together where they met. In this way, after a heat treatment a remanence of about 0.9 T and a coercive field strength of about 290 A/cm were achieved. The I rings produced in this case had tolerances with respect to roundness of 0.33 to 0.43 mm.

Comparative Example 2

10 I rings with a diameter of 110.7 mm and a wall thickness of 1.5 mm were produced from an alloy comprising 28.5 percent by weight chromium, 12 percent by weight cobalt, 1.0 percent by weight molybdenum, 0.2 percent by weight titanium and for the remainder iron by bending a strip made of this alloy to form a ring and welding the ends together where they met. With these rings, after the heat treatment a remanence of about 0.8 T and a coercive field strength of about 410 A/cm were achieved. The I rings produced in this case had tolerances with respect to roundness of 0.33 to 0.38 mm.

Exemplary Embodiment 1

13 I rings with a diameter of 113 mm and a wall thickness of 1.5 mm were produced from an alloy comprising 28.4 percent by weight chromium, 12.0 percent by weight cobalt, 1.0 percent by weight molybdenum, 0.2 percent by weight titanium and for the remainder iron. In this case, the rings were produced by means of a roller spinning process, as described above. After heat treatment had taken place, the I rings had a remanence of about 0.85 T and a coercive field strength of about 370 A/cm. The I rings produced in this case had tolerances with respect to roundness of only 0.03 to 0.10 mm, which is drastically far less in comparison with the above comparative examples.

Exemplary Embodiment 2

56 I rings with a diameter of 127 mm and a wall thickness of 1.5 mm were produced from an alloy comprising 28.7 percent by weight chromium, 12.1 percent by weight cobalt, 1.0 percent by weight molybdenum, 0.2 percent by weight titanium and for the remainder iron.

These rings were produced by means of the roller spinning process according to the invention described above. After heat treatment had taken place, the I rings had a remanence of about 0.85 T and a coercive field strength of about 400 A/cm. The rings had tolerances with respect to roundness of 0.05 to 0.15 mm, which represents a drastic reduction in comparison with the roundnesses from the above comparative examples.

The hollow bodies, in particular I rings, according to the present invention are outstandingly suitable as magnetic rings for hysteresis clutches and hysteresis brakes. Furthermore, the I rings and L rings according to the invention are suitable as magnetic rings for solid gages in position measuring devices. Solid gages for positioning measuring devices and position measuring devices per se are described in detail in DE 199 36 681 A1, mentioned at the beginning.

The solid gage in FIG. 1 has a drum-shaped basic body 1, on the outer circumference of which a prefabricated I ring 4 made of a deformable permanently magnetic alloy is fastened with its inner surface region by soldering or adhesive bonding, by an adhesive or a solder 3 which establishes a surface-area connection between the I ring 4 and the basic body 1 being introduced between the basic body 1 and the I ring 4. The I ring 4 has arranged one behind the other in its circumferential direction magnetic patterns 6 with different magnetizations segment by segment on a circular circumferential surface of the I ring lying opposite the surface region connected to it.

The prefabricated I ring 4 shown there was formed by bending and subsequently welding together a base material in strip form. This required that a groove 2 in which the bead 7 of the welded connection 5 of the I ring 4 could engage was provided on the outer circumference of the basic body.

Figure 2:
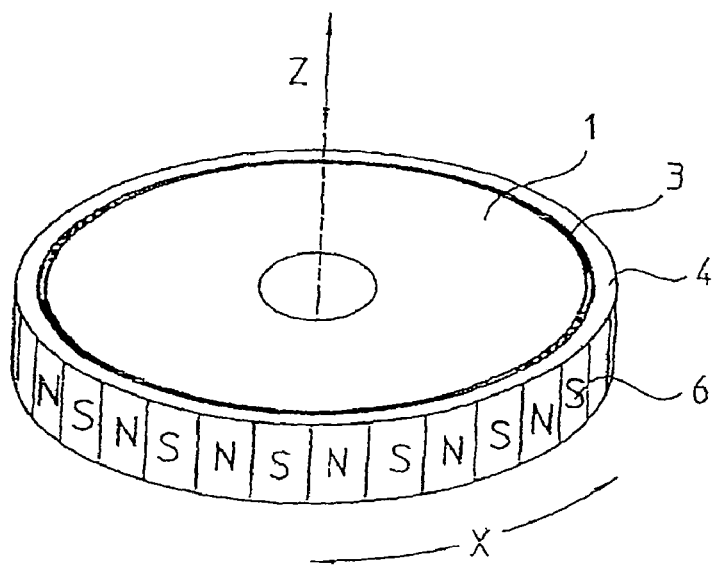
FIG. 2 shows a solid gage with an I ring according to the invention.

According to the present invention, the bead is now no longer needed, since the present I rings are not assembled by means of a welded connection. On account of the non-cutting shaping process according to the invention, seamless rings can be produced with significantly better roundnesses, so that the solid gage in position measuring devices such as those described in DE 199 36 681 can be simplified and very much improved. The method with which we are now concerned allows the rings to be attached to the basic bodies much more easily, so that there is no longer any bead, which can be seen directly from comparing FIGS. 1 and 2.

We claim:

1. A process for the production of a seamless rotationally symmetrical hollow body, said process comprising:
    melting of a deformable permanently magnetic alloy and casting the alloy to form an ingot;
    hot forming of the ingot to form a thin slab;
    hot forming of the thin slab to form a hot strip with a fine-crystalline microstructure comprising an average grain size of <300 µm;
    intermediate annealing of the hot strip above a temperature of 800° C.;
    cold forming of the hot strip to form a strip;
    production of a round blank from the strip;
    roller spinning of the round blank to form a hollow body; and
    magnetic annealing of the hollow body.

2. A process as claimed in claim 1, wherein the hot forming of the ingot to form a thin slab occurs at temperatures above 1100° C.

3. A process as claimed in claim 1, wherein the second hot forming occurs with a degree of hot forming of more than 90%.

4. A process as claimed in claim 2, wherein the second hot forming occurs with a degree of hot forming of more than 90%.

5. A process as claimed in claim 1, wherein cold forming of the thin slab to form a strip occurs with a degree of cold forming of less than 20%.

6. A process as claimed in claim 2, wherein cold forming of the thin slab to form a strip occurs with a degree of cold forming of less than 20%.

7. A process as claimed in claim 3, wherein cold forming of the thin slab to form a strip occurs with a degree of cold forming of less than 20%.

8. A process as claimed in claim 4, wherein cold forming of the thin slab to form a strip occurs with a degree of cold forming of less than 20%.

9. A process as claimed in claim 1, wherein the round blank produced from the strip is surface-treated.

10. A process as claimed in claim 2, wherein the round blank produced from the strip is surface-treated.

11. A process as claimed in claim 3, wherein the round blank produced from the strip is surface-treated.

12. A process as claimed in claim 5, wherein the round blank produced from the strip is surface-treated.

13. A process as claimed in claim 9, wherein the depth of roughness of the round blank being set to less than 15 µm by means of the surface treatment.

14. A process as claimed in claim 9, wherein the surface treatment of the round blank occurs mechanically.

15. A process as claimed in claim 13, wherein the surface treatment of the round blank occurs mechanically.

16. A process as claimed in claim 9, wherein the surface treatment of the round blank occurs chemically.

17. A process as claimed in claim 13, wherein the surface treatment of the round blank occurs chemically.

18. A process as claimed in claim 1, wherein the alloy comprises cobalt, chromium, and iron.

19. A process as claimed in claim 18, wherein the alloy further comprises one or more of the elements selected from the group consisting of Zr, Ti, Hf, V, Nb, Ta, Mo, W, Mn, Si, Al, Ni, Sn, Cu, Zn, Ge, B, and rare earths accounting for a total proportion of the alloy of less than 5 percent by weight.

20. A process for the production of a seamless rotationally symmetrical hollow body, said process comprising:
    melting of a deformable permanently magnetic alloy, consisting essentially of 5.0 to 20.0 percent by weight cobalt, 20.0 to 35.0 percent by weight chromium, one or more of the elements selected from the group consisting of Zr, Ti, Hf, V, Nb, Ta, Mo, W, Mn, Si, Al, Ni, Sn, Cu, Zn, Ge, B, and rare earths accounting for a total proportion of the alloy of less than 5 percent by weight, and the remainder iron and impurities caused by melting or by chance or both, and casting the alloy to form an ingot;

hot forming of the ingot to form a thin slab;

hot forming of the thin slab to form a hot strip with a fine-crystalline microstructure comprising an average grain size of <300 μm;

intermediate annealing of the hot strip above a temperature of 800° C.;

cold forming of the hot strip to form a strip;

production of a round blank to form a hollow body; and magnetic annealing of the hollow body.

* * * * *